(12) United States Patent
Asplund

(10) Patent No.: US 8,385,097 B2
(45) Date of Patent: Feb. 26, 2013

(54) METHOD FOR CONTROLLING A VOLTAGE SOURCE CONVERTER AND A VOLTAGE CONVERTING APPARATUS

(75) Inventor: Gunnar Asplund, Solna (SE)

(73) Assignee: ABB Technology AG, Zurich (CH)

( * ) Notice: Subject to any disclaimer, the term of this patent is extended or adjusted under 35 U.S.C. 154(b) by 319 days.

(21) Appl. No.: 12/811,806

(22) PCT Filed: Jan. 8, 2008

(86) PCT No.: PCT/EP2008/050120
§ 371 (c)(1),
(2), (4) Date: Sep. 3, 2010

(87) PCT Pub. No.: WO2009/086927
PCT Pub. Date: Jul. 16, 2009

(65) Prior Publication Data
US 2010/0328977 A1    Dec. 30, 2010

(51) Int. Cl.
*H02M 7/537*    (2006.01)
*H02M 3/335*    (2006.01)
(52) U.S. Cl. .......................................... 363/131; 363/16
(58) Field of Classification Search .................... 363/16, 363/131, 147
See application file for complete search history.

(56) References Cited

U.S. PATENT DOCUMENTS 5,642,275 A * 6/1997 Peng et al. .................... 363/137
2011/0038193 A1* 2/2011 Jacobson et al. .............. 363/131

FOREIGN PATENT DOCUMENTS

| DE | 101 03 031 A1 | 7/2002 |
| WO | 2007/023064 A1 | 3/2007 |
| WO | 2007/033852 A2 | 3/2007 |

OTHER PUBLICATIONS

RU 2259628 C2; Publication Date Aug. 27, 2005; L.F. Kolomeytsev et al.; Multilayer voltage inverter and its control process; pp. 1-2.
Angulo et al., "Level-shifted PWM for Cascaded Multilevel Inverters with Even Power Distribution ", Power Electronics Specialists Conference, IEEE, Jun. 1, 2007, pp. 2373-2378, XP031142122.
Jin et al., "A Study on the Multi-Carrier PWM Methods for Voltage Balancing of Flying Capacitor in the Flying Capacitor Multi-Level Inverter", Industrial Electronics Society, IEEE, Nov. 6, 2005, pp. 721-726, XP010875962.

* cited by examiner

*Primary Examiner* — Adolf Berhane
*Assistant Examiner* — Emily Pham
(74) *Attorney, Agent, or Firm* — Birch, Stewart, Kolasch & Birch, LLP

(57) ABSTRACT

In a method for controlling a Voltage Source Converter having at least one phase leg comprising a series connection of switching elements, in which each said element has at least two semiconductor devices of turn-off type, at least two freewheeling diodes connected in parallel therewith and at least one energy storing capacitor, each said switching element is controlled according to a Pulse Width Modulation pattern so that each switching element is switched to change between applying a zero voltage and the voltage across its capacitor across its terminals each time a saw tooth voltage wave for that switching element crosses a reference alternating voltage belonging to that switching element.

33 Claims, 5 Drawing Sheets

8b 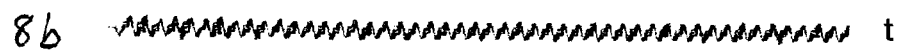
8c 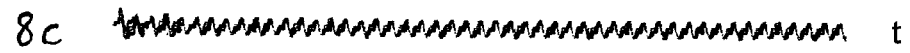

9b 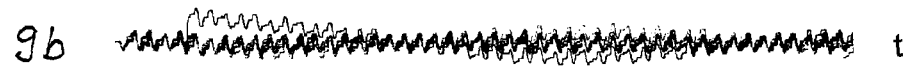
9c 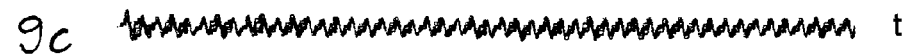

10b 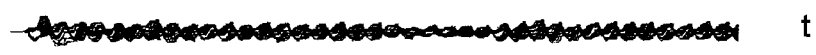
10c 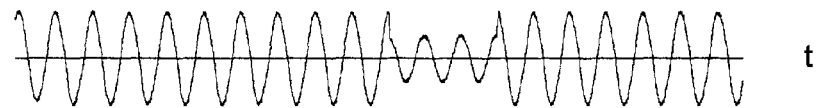

11b 
11c 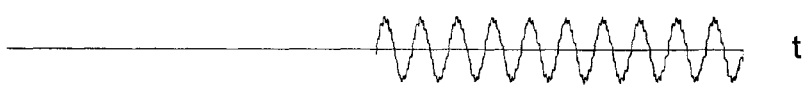

METHOD FOR CONTROLLING A VOLTAGE SOURCE CONVERTER AND A VOLTAGE CONVERTING APPARATUS

TECHNICAL FIELD OF THE INVENTION AND BACKGROUND ART

The present invention relates to a method for controlling a Voltage Source Converter configured to convert direct voltage into alternating voltage and conversely and having at least one phase leg connecting two opposite poles of a direct voltage side of the converter and comprising a series connection of switching elements, each said element having at least two semiconductor devices of turn-off type, at least two free-wheeling diodes connected in parallel therewith and at least one energy storing capacitor, a mid point of said series connection forming a phase output being configured to be connected to an alternating voltage side of the converter and to divide the phase leg into an upper valve branch and a lower valve branch, said semiconductor devices of each switching element being controlled to obtain, for that switching element, one of a) a first switching state and b) a second switching state, in which for a) the voltage across said at least one energy storing capacitor and for b) a zero voltage, is applied across terminals of the switching element, for obtaining a determined said alternating voltage on said phase output, as well as an apparatus for converting alternating voltage into direct voltage and conversely according to the preamble of the appended independent apparatus claim.

The converter to be controlled may have any number of said phase legs, but it has normally three such phase legs for having a three phase alternating voltage on the alternating voltage side thereof.

A voltage source converter of this type may be used in all kinds of situations, in which direct voltage is to be converted into alternating voltage or conversely, in which examples of such uses are in stations of HVDC-plants (High Voltage Direct Current), in which direct voltage normally is converted into a three-phase alternating voltage and conversely or in so-called back-to-back-stations in which alternating voltage is firstly converted into direct voltage and this is then converted into alternating voltage. However, the present invention is not restricted to these applications, but other applications are also conceivable, such as in different types of drive systems for machines, vehicles etc.

A Voltage Source Converter of the type to be controlled through said method is known through for example DE 101 03 031 A1 and WO 2007/023064 A1 and normally called a multi-cell converter or M2LC. Reference is made to these publications for the functioning of a converter of this type. Said switching elements of the converter may have other appearances than those shown in said publications, and it is for instance possible that each switching element has more than one said energy storing capacitor, as long as it is possible to control the switching element to be switched between the two states mentioned in the introduction.

The present invention is primarily, but not exclusively, directed to the control of a voltage source converter configured to transmit high powers, and the case of transmitting high powers will for his reason hereinafter be discussed for illuminating but not in any way restricting the invention thereto. When such a Voltage Source Converter is used to transmit high powers this also means that high voltages are handled, and the voltage of the direct voltage side of the converter is determined by the voltages across said energy storing capacitors of the switching elements and is normally set to be half the sum of these voltages. This means that a comparatively high number of such switching elements are to be connected in series or a high number of semiconductor devices are to be connected in series in each said switching element, and a Voltage Source Converter of this type is particularly interesting when the number of the switching elements is comparatively high, such as at least 8, and it may well be in the order of 20. A high number of such switching elements connected in series in said phase leg means that it will be possible to control these switching elements to change between said first and second switching state and already at said phase output obtain an alternating voltage being very close to a sinusoidal voltage. This may be obtained already by means of substantially lower switching frequencies than typically used in known Voltage Source Converters of the type shown in FIG. 1 in DE 101 03 031 A1 having switching elements with at least one semiconductor device of turn-off type and at least one free wheeling diode connected in anti-parallel therewith. This makes it possible to obtain substantially lower switching losses and also considerably reduces problems of filtering of harmonic currents and radio interference, so that equipment therefor may be less costly.

A method of the type defined in the introduction is known through DE 101 03 031 A1 mentioned above and WO 2007/033852 A1. The latter describes a control method which is said to be a further development of the control method according to the former one. This control method starts from a synchronous control of switching the switching elements in the upper and lower valve branch for maintaining the same number of switching elements in each of said switching states in said series connection of switching elements between the direct voltage poles, and deviations therefrom is carried out for controlling valve branch currents with the aim to avoid balancing currents between the phase legs of the converter. These known control methods may in some situations have drawbacks, such as with respect to degree of complication and costs.

SUMMARY OF THE INVENTION

The object of the present invention is to provide a method of the type defined in the introduction being an alternative to such methods already known and described above by functioning well and having certain merits, such as for example being robust and reacting fast to changes of the operating conditions of the converter.

This object is obtained by providing such a method further comprising the following steps:
  each switching element is for said control given on one hand an individual saw tooth voltage, the saw tooth voltages of the switching elements being identical but evenly distributed over the time with respect to each other with a phase shift of $2\pi/(pN)$ between adjacent such saw tooth voltages, in which p is the pulse number defined as period of a reference alternating voltage/period of the saw tooth voltage and N the number of switching elements in said phase leg, and on the other an individual said reference alternating voltage with the same frequency and phase as that of the other said switching elements,
  said switching elements are controlled according to a Pulse Width Modulation pattern so that each switching element is switched to change said switching state from the first to the second and conversely each time the saw tooth voltage wave for that switching element crosses the reference alternating voltage belonging to that switching element, the voltage across said energy storing capacitor of each switching element is measured during the control of the converter and compared with a reference direct voltage, and the result of this comparison is used as a feed back control signal for setting the amplitude of said individual reference alternating voltage on the basis of the result of said comparison.

It has turned out that this method of controlling the switching elements according to a Pulse Width Modulation pattern with distributed individual saw tooth voltages and individual reference alternating voltages adapted to the actual voltage across said energy storing capacitor of the respective switching element results in a very robust and extremely fast control, so that an extremely smooth alternating voltage curve with a low sensitivity to harmonics and other disturbances, such as earth faults, on an alternating voltage network connected to the alternating voltage side of the converter may be obtained. A key issue is to keep the voltages across the energy storing capacitors of the switching elements at substantially the same level, which is obtained by measuring these voltages and adapting the individual reference alternating voltages according to the result of this measurement.

It should be noted that it is to be considered to be equivalent to have the same phase for all the saw tooth voltages and evenly distribute said individual reference alternating voltages over the time with respect to each other with said phase shift instead and the invention as defined in claim 1 is intended to cover also this.

According to an embodiment of the invention said reference direct voltage is obtained by measuring the direct voltage across said poles of the direct voltage side of the converter. The voltage measured across said energy storing capacitor of each switching element may then be compared with $2 \times U_D/N$, in which $U_D$ is the direct voltage measured across said poles. It is suitable to have a direct voltage across said poles being half of the sum of the direct voltages across the terminals of the switching elements.

Said reference direct voltage may also be obtained by calculating an average of the voltages measured across said energy storing capacitors of the switching elements.

According to another embodiment of the invention the amplitude of said individual reference alternating voltage is controlled to be lowered or raised with respect to the amplitude of a mid reference alternating voltage, which corresponds to an amplitude of said individual reference alternating voltage for a direct voltage measured across said energy storing capacitor of that switching element being an average of such voltages measured for all said switching elements, depending upon a difference of said direct voltage measured and said average voltage.

According to another embodiment of the invention a proportional control is used when setting the amplitude of said individual reference alternating voltage, so that the difference in amplitude of two such individual reference alternating voltages will be proportional to the difference in voltage measured across said energy storing capacitors of these switching elements, which will constitute a simple way of carrying out the control resulting in the advantages mentioned above of keeping the voltage across the energy storing capacitor at substantially the same level while obtaining a smooth alternating voltage curve shape.

According to another embodiment of the invention the alternating voltage of said alternating voltage side of the converter is measured during the control of the converter and the amplitude of this alternating voltage is used when setting the amplitudes of said individual reference alternating voltages. This improves the reaction of said control upon fluctuations of the alternating voltage on said alternating voltage side of the converter.

According to another embodiment of the invention said pulse number p is set to be a non integer. This means that each switching element will have a different phase of its saw tooth voltage each cycle of the reference alternating voltage, which gives a balancing effect of the voltages across the energy storing capacitors of the switching elements. It has turned out that by setting the pulse number p to be a non integer a very low pulse number may be selected and still ensuring that the voltages across the different switching elements connected in series are substantially the same and a smooth alternating voltage curve shape is obtained. The lower the pulse number the lower the switching losses of the converter, which makes it clear that this feature is very favourable.

According to another embodiment of the invention said pulse number being a non integer is continuously or intermittently varied during said control, which may have a further balancing effect on said voltages across the switching elements making it possible to choose an even lower pulse number. The pulse number may then be controlled to go up and down within a pulse number interval during the control of the converter. It is pointed out that "pulse number is set to be a non integer" is to be interpreted to also cover the case in which this number is temporarily an integer during said variation of the pulse number.

According to another embodiment of the invention the method is carried out for a converter in which N≧8, N is 12-32 or N is 16-24. These are suitable numbers of switching elements in said phase leg for obtaining a smooth alternating voltage curve shape with low requirements on filtering equipment.

According to another embodiment of the invention said pulse number p is set to be <10, <8 or <5, and 2. The frequency of said alternating voltage is normally 50 Hz or 60 Hz, although other frequencies are conceivable, so that for instance a pulse number of 5 would mean a switching frequency in said Pulse Width Modulation of 500 Hz or 600 Hz, which is approximately 5–10 times lower than for known two level Voltage Source Converters and accordingly results in considerably lower switching losses.

According to another embodiment of the invention the method is carried out for a converter in which N=16, and the pulse number p is set to be 3<p<4, such as 3.4. Such a low pulse number in combination with such a number of switching elements connected in series has turned out to result in the advantages of the present invention mentioned above.

According to another embodiment of the invention said pulse number is set to be an integer above 10. It has turned out that the control method according to the present invention functions well also for pulse numbers being an integer, but they should then be above 10 for resulting in an acceptable maintaining of the direct voltage across the different switching elements on substantially the same level, which means higher switching losses than would the pulse number be lower by being set to be a non integer.

According to another embodiment of the invention said individual saw tooth voltages used for said control are distributed over the time so that every second belongs to said upper valve branch and every second to said lower valve branch, which contributes to the simplicity of the control method according to the invention.

According to another embodiment of the invention the semiconductor devices in said switching elements are IGBTs or GTOs, but also other semiconductor devices of turn-off type are possible.

According to another embodiment of the invention it is a Voltage Source Converter having said direct voltage side connected to a direct voltage network for transmitting High Voltage Direct Current (HVDC) and the alternating voltage side connected to an alternating voltage phase line belonging to an alternating voltage network that is controlled. This constitutes a particularly interesting application of the present invention, in which problems with high switching losses and requirement of robustness and fastness are particularly accentuated.

According to another embodiment of the invention it is a Voltage Source Converter configured to have a direct voltage across said two poles being 1 kV-1200 kV, 10 kV-1200 kV or 100 kV-1200 kV that is controlled.

The invention also relates to an apparatus for converting alternating voltage according to the appended independent apparatus claim. The advantages and advantageous features of this apparatus and embodiments thereof defined in the appended depended apparatus claims appear clearly from the discussion above of the method according to the present invention.

The invention also relates to a plant for transmitting electric power according to the appended claim therefor.

The invention further relates to a computer program and a computer readable medium according to the corresponding appended claims. It is easily understood that the method according to the invention defined in the appended set of method claims is well suited to be carried out through program instructions from a processor which may be influenced by a computer program provided with the program steps in question.

Further advantages as well as advantageous features of the invention will appear from the following description.

BRIEF DESCRIPTION OF THE DRAWINGS

With reference to the appended drawings, below follows a description of embodiments of the invention cited as examples.

In the drawings:

FIGS. 8-11 show simulations carried out for a method for controlling one phase leg of a Voltage Source Converter according to FIG. 1, in which FIG. 10b is the voltages across the capacitors of the sixteen switching elements in the Voltage Source Converter according to FIG. 1 and FIG. 10c shows the alternating voltage on the alternating voltage side of the converter, FIG. 11b is the voltages across the capacitors of the sixteen switching elements in the Voltage Source Converter according to FIG. 1 and FIG. 11c shows the alternating voltage on the alternating voltage side of the converter.

DETAILED DESCRIPTION OF EMBODIMENTS OF THE INVENTION

Figure 1:
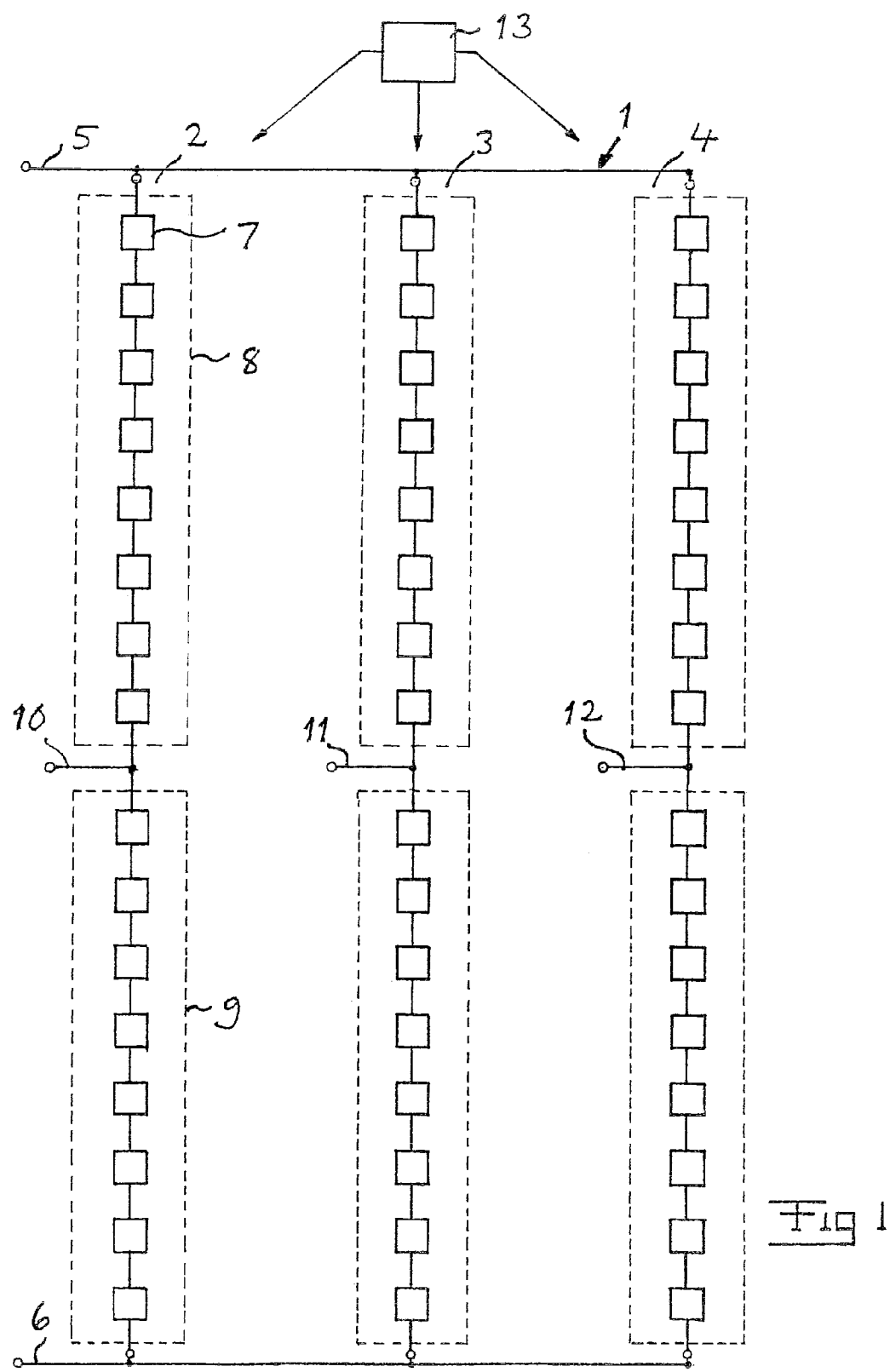
FIG. 1 is a very simplified view of a Voltage Source Converter of the type to be controlled by a method according to the present invention, FIG. 2

FIG. 1 illustrates very schematically the general construction of a Voltage Source Converter 1 to which the control method according to the invention may be applied. This converter has three phase legs 2-4 connected to opposite poles 5, 6 of a direct voltage side of the converter, such as a direct voltage network for transmitting high voltage direct current. Each phase leg comprises a series connection of switching elements 7 indicated by boxes, in the present case 16 to the number, and this series connection is divided into two equal parts, an upper valve branch 8 and a lower valve branch 9, separated by a mid point 10-12 forming a phase output being configured to be connected to an alternating voltage side of the converter. The phase outputs 10-12 may possibly through a transformer connect to a three phase alternating voltage network, load, etc. Filtering equipment is also arranged on said alternating voltage side for improving the shape of the alternating voltage on said alternating voltage side.

A control arrangement 13 is arranged for controlling the switching elements 7 and by that the converter to convert direct voltage into alternating voltage and conversely, and how this control arrangement is constructed and configured to control the converter is what this invention is all about and will be explained more in detail further below.

Figure 2:
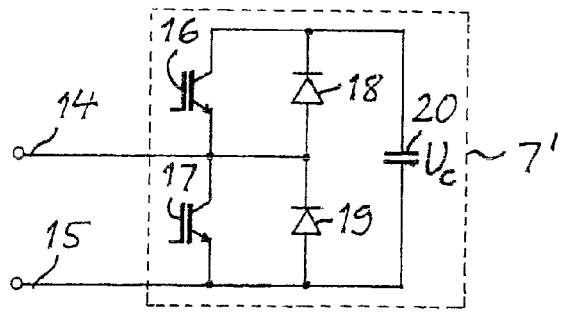
Figure 3:
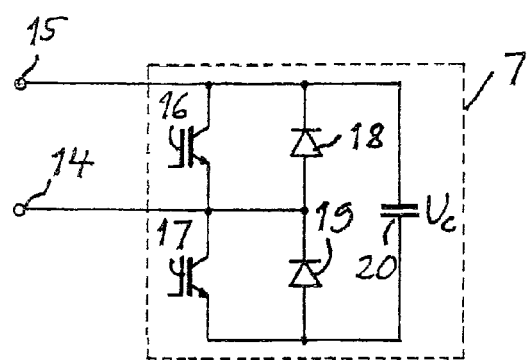
FIG. 3 illustrates two different known switching elements, which may be a part of a Voltage Source Converter to be controlled by the method according to the invention.

The method according to the present invention is intended for control of Voltage Source Converters with switching elements 7 of the type having at least two semiconductor devices of turn-off type, at least two free wheeling diodes connected in parallel therewith and at least one energy storing capacitor, and two examples of such switching elements are shown in FIG. 2 and FIG. 3. The terminals 14, 15 of the switching element are adapted to be connected to adjacent switching elements in the series connection of switching elements forming a phase leg. The semiconductor devices 16, 17 are in this case IGBTs connected in parallel with diodes 18, 19. An energy storing capacitor 20 is connected in parallel with the respective series connection of the diodes and the semiconductor devices. One terminal 14 is connected to the mid point between the two semiconductor devices as well as the mid point between the two diodes. The other terminal 15 is connected to the energy storing capacitor 20, in the embodiment of FIG. 2 to one side thereof and in the embodiment according to FIG. 3 to the other side thereof. It is pointed out that each semiconductor device and each diode as shown in FIG. 2 and FIG. 3 may be more than one connected in series for being able to handle the voltages to be handled, and the semiconductor devices so connected in series may then be controlled simultaneously so as to act as one single semiconductor device.

The switching elements shown in FIG. 2 and FIG. 3 may be controlled to obtain one of a) a first switching state and b) a second switching state, in which for a) the voltage across the capacitor 20 and for b) a zero voltage is applied across the terminals 14, 15. For obtaining the first state in FIG. 2 the semiconductor device 16 is turned on and the semiconductor device 17 turned off and in the embodiment according to FIG. 3 the semiconductor device 17 is turned on and the semiconductor 16 is turned off. The switching elements are switched to the second state by changing the state of the semiconductor devices, so that in the embodiment according to FIG. 2 the semiconductor device 16 is turned off and 17 turned on and in FIG. 3 the semiconductor device 17 is turned off and 16 turned on.

Figure 4:
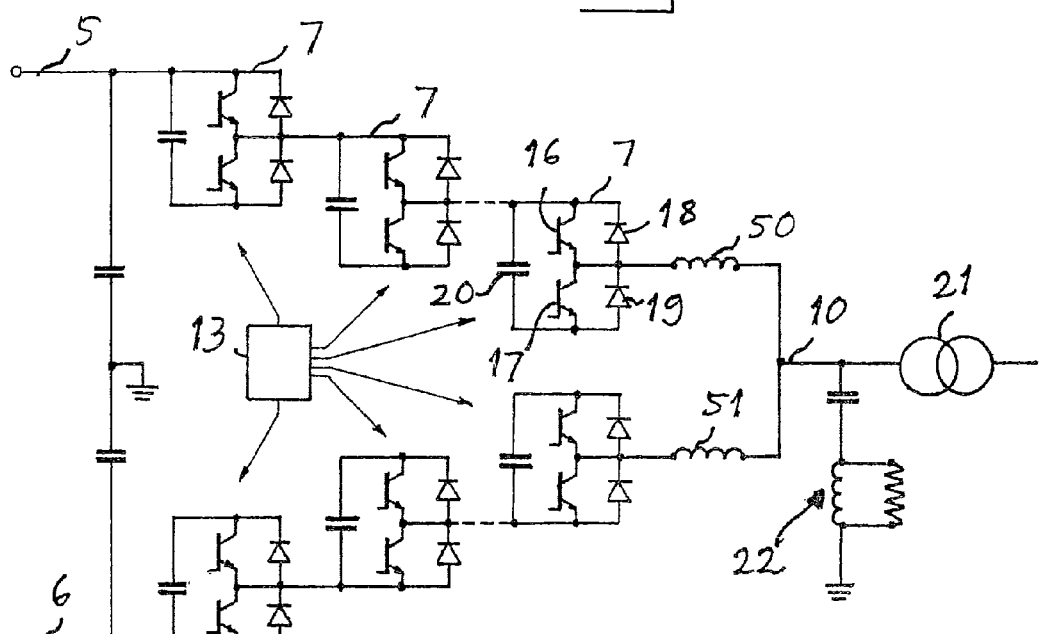
FIG. 4 is a simplified view very schematically illustrating an apparatus for converting voltage according to the present invention.

FIG. 4 shows a little more in detail how a phase leg of the converter according to FIG. 1 is formed by switching elements of the type shown in FIG. 3, in which totally ten switching elements have been left out for simplifying the drawing. The control arrangement 13 is adapted to control the switching elements by controlling the semiconductor devices thereof, so that they will either deliver a zero voltage or the voltage across the capacitor to be added to the voltages of the other switching elements in said series connection. A transformer 21 and filtering equipment 22 are here also indicated. It is shown how each valve branch is through a phase reactor 50, 51 connected to the phase output 10, and such phase reactors should also be there in FIG. 1 for the phase outputs 10, 11 and 12, but have there been left out for simplifying the illustration.

Figure 5:
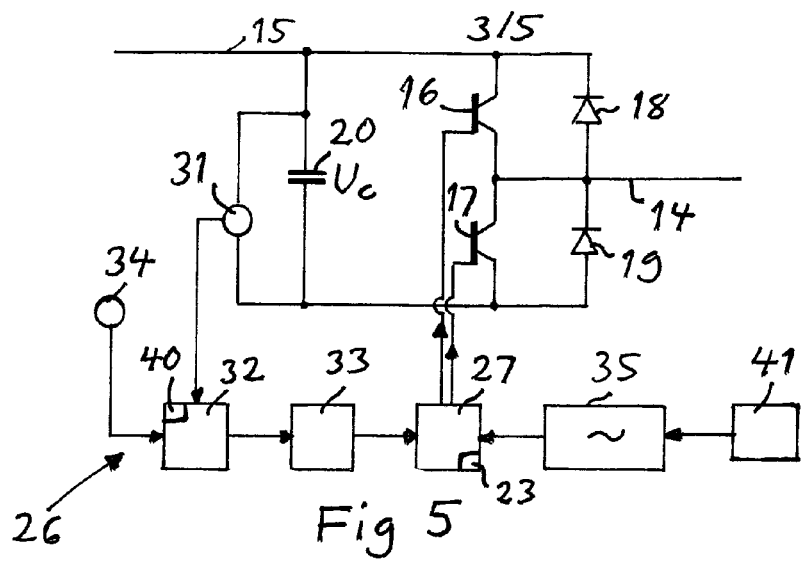
FIG. 5 is a more detailed view of a part of the apparatus according to FIG. 4 for one switching element of the Voltage Source Converter.
Figure 6:
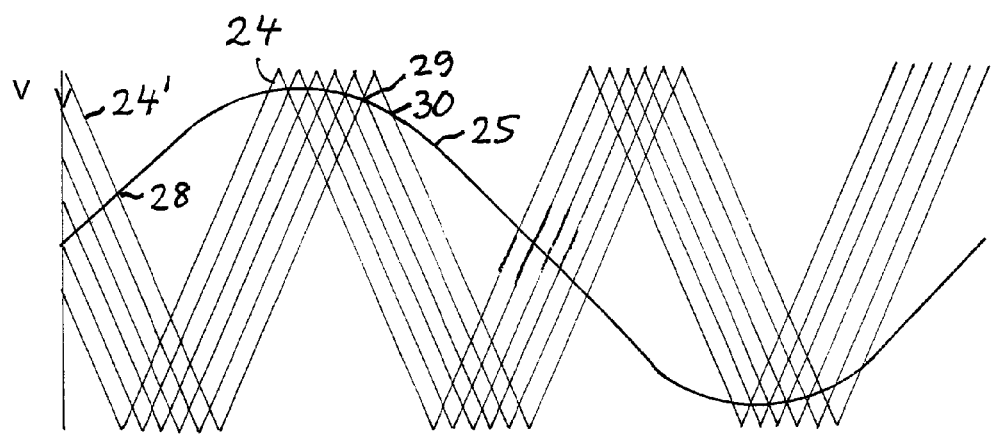
FIG. 6 is a graph showing the individual saw tooth voltages for six of the sixteen switching elements in a phase leg of a Voltage Source Converter according to FIGS. 1 and 4 and a reference alternating voltage used for carrying out a control according to a Pulse Width Modulation pattern, FIG. 7 schematically illustrates the saw tooth voltage of one switching element and the individual reference alternating voltage for this switching element with an amplitude lowered with respect to the amplitude of a mid reference alternating voltage.

The method according to the present invention will now be explained while making reference also to FIG. 5 and FIG. 6. A part of the control arrangement 13 is shown more in detail in FIG. 5. This control arrangement comprises first means 23 configured to deliver an individual saw tooth voltage 24 for the control of each switching element of the phase leg. These saw tooth voltages of the switching elements are identical but evenly distributed over the time with respect to each other with a phase shift of $2\pi/pN$ between adjacent such saw tooth voltages, in which p is the pulse number defined as period of the reference alternating voltage 25/period of the saw tooth voltage 24 and N the number of switching elements in the phase leg. For simplifying the illustration the saw tooth voltage of only six of the sixteen switching elements for a phase leg of the Voltage Source Converter according to FIG. 1 are shown in FIG. 6.

The control arrangement also comprises second means 26 configured to deliver an individual said reference alternating voltage 25 to each said switching element with the same frequency and phase as that of the other said switching elements. The control arrangement also comprises control means 27 configured to control the switching elements according to a Pulse Width Modulation pattern so that each switching element is switched to change said switching state from the first to the second and conversely each time the saw tooth voltage wave for that switching element crosses the reference alternating voltage belonging to that switching element. This means that for instance when we assume that the reference alternating voltage 25 shown in FIG. 6 belongs to the saw tooth voltage 24' the semiconductor device 16 may be turned on and the semiconductor device 17 be turned off at the crossing point 28 for delivering a zero voltage across the terminals 15, 14 until the next crossing point 29, in which the semiconductor device 16 is turned off and the semiconductor device 17 turned on for applying the voltage $U_C$ across the capacitor 20 between the two terminals 15, 14 until the next crossing point 30 and so on.

Figure 7:
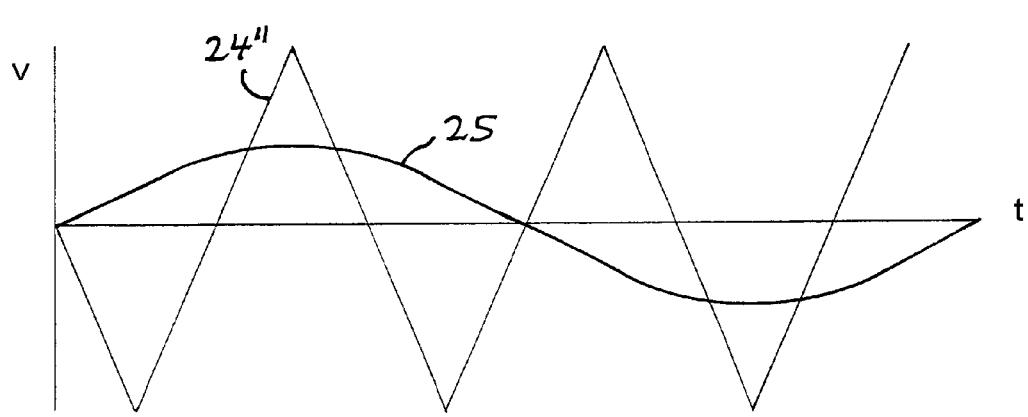

The reference alternating voltage 25 will have a frequency being equal to that of the voltage on the alternating voltage side of the converter, such as 50 Hz or 60 Hz. The second means 26 comprises a first member 31 adapted to measure the voltage across the capacitor 20 of each switching element, a second member 32 adapted to compare that direct voltage with a reference direct voltage, which may be delivered by a member 40 calculating an average of the voltages measured across the capacitors in all switching elements, as well as a third member 33 configured to calculate and set the amplitude of said individual reference alternating voltage for each said switching element on the basis of the result of said comparison. A fourth member 34 is indicated in FIG. 5 and configured to measure the direct voltage across the poles 5, 6 of the direct voltage side of the converter and deliver the result of this measurement to the second member 32 for said comparison. This means in the practice that the amplitude of the individual reference alternating voltage for a single switching element is raised or lowered when the voltage across the capacitor 20 belonging to that switching element deviates from the average voltage of all the switching element capacitors of the phase leg. FIG. 7 shows how the amplitude of an individual reference alternating voltage 25 has been changed for a switching element, in which only the individual saw tooth voltage for this switching element is shown in this Figure. Thus, the Pulse Width Modulation pattern of this switching element will be decided by the crossing point of the curves 25 and 24" shown in FIG. 7. It has turned out that his way of individually adjusting the reference alternating voltage for each switching element will have a balancing effect on the direct voltages across the capacitors of the switching elements, so that if a voltage of a capacitor of a switching element is lowered below said average direct voltage the adjustment of the amplitude of the reference alternating voltage will tend to raise the voltage across this capacitor and conversely if this voltage is higher than said average direct voltage.

The control arrangement also comprises a main control unit 35 adapted to provide the control member 27 for the PWM with said pulse number p and a phase position of said reference alternating voltages with respect to the alternating current on the alternating voltage side of the converter depending upon need of power consumption and the like. The control unit 35 may also influence the amplitude of the reference alternating voltages depending upon measurement by means 41 of the alternating voltage present existing on the alternating voltage side of the converter.

Simulations have been done for a phase leg of a converter according to FIG. 1 controlled by the method according to the present invention as described above for a pulse number of 3.37 and a frequency of 50 Hz of the alternating voltage. The simulations have shown that a selection of a non integer as pulse number has a balancing effect of the voltages across the capacitors of the different switching elements, so that a pulse number being that low may be selected. Simulations with a pulse number of 3 have shown that these capacitor voltages will in such a case not be constant and the output alternating voltage will be very distorted.

Figure 8A:
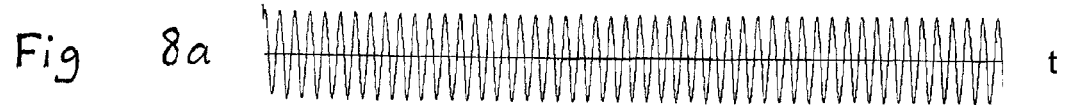
FIG. 8a is the alternating voltage of the alternating voltage side of the converter versus time, FIG. 8b the voltages of the capacitors of the eight upper switching elements and FIG. 8c the voltages of the capacitors of the eight lower switching elements.

FIG. 8a shows the alternating voltage calculated through said simulations versus time on the alternating voltage side of the converter for a pulse number of 3.37. FIG. 8b and FIG. 8c show the voltages of the capacitors of the upper valve branch and the lower valve branch, respectively. It appears that these voltages are kept on a substantially constant level and the alternating voltage resulting from the control scheme has in spite of low pulse number a comparatively smooth and regular shape requiring a low filter capacity.

Figure 9A:
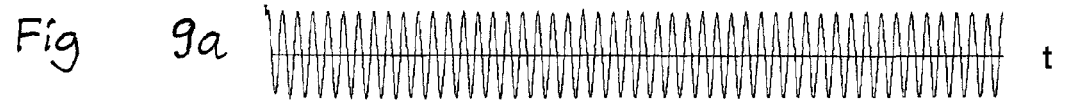
FIG. 9a is the alternating voltage of the alternating voltage side of the converter versus time upon a disturbance in one capacitor of an upper switching element in the Voltage Source Converter according to FIG. 1, FIG. 9b the voltages of the capacitors of the eight upper switching elements and FIG. 9c the voltages of the capacitors of the eight lower switching elements.

FIGS. 9a-c correspond to FIGS. 8a-c for the case of a disturbance in the capacitor of the first switching element in the upper valve branch. It is observed that this disturbance does not influence the alternating voltage resulting from the control scheme according to the present invention. No change of the Pulse Width Modulation pattern is carried out here.

Figure 10A:
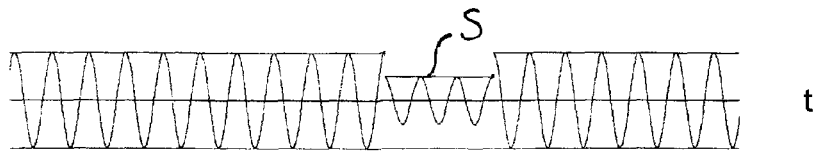
FIG. 10a is the mid reference alternating voltage versus time, in which a step appears therein.

FIG. 10 is shown for illustrating how fast the response of the control method according to the present invention upon a change in the reference alternating voltage is, in which such a change may emanate from for instance an earth fault in an alternating voltage network connecting to the alternating voltage side of the converter. FIG. 10a shows the reference alternating voltage and how a step S is created therein, FIG. 10b the voltages across all the sixteen switching element capacitors and FIG. 10c the alternating voltage resulting on the alternating voltage side of the converter. It may be observed that the response is very fast and that the voltages of the capacitors are very fast returning to normal.

Figure 11A:
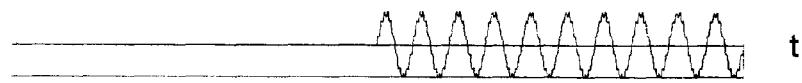
FIG. 11a is the mid reference alternating voltage versus time, with a harmonic signal added to the reference alternating voltage.

Finally, FIG. 11 is used for showing the low sensitivity of the control method according to the present invention to harmonic signals appearing on the alternating voltage side of the converter. A 10% eleventh harmonic voltage is added to the reference alternating voltage shown in 11a in said simulations. FIG. 11b shows the voltages of all sixteen switching element capacitors, and FIG. 11c shows the output alternating voltage of the converter, from which it appears that the control method according to the present invention is also very robust with respect to the occurrence of harmonics.

The control may preferably, but not necessarily, be carried out so that the individual saw tooth voltages used for the control are distributed over the time so that every second belongs to the upper valve branch and every second to the lower valve branch.

The invention is of course not in any way restricted to the embodiments described above, but many possibilities to modifications thereof will be apparent to a person with ordinary skill in the art without departing from the basic idea of the invention as defined in the appended claims.

The invention claimed is:

1. A method for controlling a Voltage Source Converter configured to convert direct voltage into alternating voltage and conversely and having at least one phase leg connecting two opposite poles of a direct voltage side of the converter and comprising a series connection of switching elements, each of said switching elements having at least two semiconductor devices of turn-off type, at least two free-wheeling diodes connected in parallel therewith and at least one energy storing capacitor, a mid point of said series connection forming a phase output being configured to be connected to an alternating voltage side of the converter and to divide the phase leg into an upper valve branch and a lower valve branch, said at least two semiconductor devices of each of said switching elements being controlled to obtain, for each of said switching elements, one of a) a first switching state and b) a second switching state, in which for a) the first switching state, the voltage across said at least one energy storing capacitor or for b) the second switching state, a zero voltage, is applied across terminals of the each of switching elements, for obtaining a determined said alternating voltage on said phase output, wherein each of said switching elements is provided with an individual saw tooth voltage, the saw tooth voltages of the switching elements being identical but evenly distributed over the time with respect to each other with a phase shift of $2\pi/(pN)$ between adjacent saw tooth voltage, in which p is the pulse number defined as period of a reference alternating voltage/period of the saw tooth voltage and N is the number of switching elements in said phase leg, and is also provided with an individual said reference alternating voltage with the same frequency and phase as that of the other said switching elements, said switching elements are controlled according to a Pulse Width Modulation pattern so that each of said switching elements is switched to change from said first switching state to said second switching state and conversely each time the saw tooth voltage wave for the corresponding switching element crosses the reference alternating voltage belonging to the corresponding switching element, the voltage across said at least one energy storing capacitor of each of said switching elements is measured during the control of the converter and compared with a reference direct voltage, and a result of said comparison is used as a feedback control signal for setting the amplitude of said individual reference alternating voltage on the basis of the result of said comparison.

2. The method according to claim 1, wherein said reference direct voltage is obtained by measuring the direct voltage across said poles of the direct voltage side of the converter.

3. The method according to claim 1, wherein said reference direct voltage is obtained by calculating an average of the voltages measured across said energy storing capacitors of the switching elements.

4. The method according to claim 1, wherein the amplitude of said individual reference alternating voltage is controlled to be lowered or raised with respect to the amplitude of a mid reference alternating voltage, which corresponds to an amplitude of said individual reference alternating voltage for a direct voltage measured across said at least one energy storing capacitor of the corresponding switching element being an average of such voltages measured for all said switching elements, depending upon a difference of said direct voltage measured and said average voltage.

5. The method according to claim 2, wherein said voltage measured across said at least one energy storing capacitor of each of said switching elements is compared with $2 \times U_D/N$, in which $U_D$ is the direct voltage measured across said poles.

6. The method according to claim 1, wherein a proportional control is used when setting the amplitude of said individual reference alternating voltage, so that the difference in amplitude of two such individual reference alternating voltages will be proportional to the difference in voltage measured across said energy storing capacitors of said switching elements.

7. The method according to claim 1, wherein the alternating voltage on said alternating voltage side of the converter is measured during the control of the converter and the amplitude of this alternating voltage is used when setting the amplitudes of said individual reference alternating voltages.

8. The method according to claim 1, wherein said pulse number p is set to be a non-integer.

9. The method according to claim 8, wherein said pulse number is continuously or intermittently varied during said control.

10. The method according to claim 9, wherein said pulse number is controlled to go up and down within a pulse number interval during the control of the converter.

11. The method according to claim 1, wherein it is carried out for a converter in which $N \geq 8$.

12. The method according claim 1, wherein said pulse number p is set to be <10 and $\geq 2$.

13. The method according to claim 11, wherein it is carried out for a converter in which N=16, and that the pulse number p is set to be 3<p<4.

14. The method according to claim 1, wherein said pulse number is set to be an integer above 10.

15. The method according to claim 1, wherein said individual saw tooth voltages used for said control are distributed over the time so that every second belongs to said upper valve branch and every second to said lower valve branch.

16. The method according to claim 1, wherein it is a converter having IGBTs (Insulated Gate Bipolar Transistor) or GTOs (Gate Turn-Off thyristor) as said at least two semiconductor devices that is controlled.

17. The method according to claim 1, wherein it is a Voltage Source Converter having said direct voltage side connected to a direct voltage network for transmitting High Voltage Direct Current (HVDC) and the alternating voltage side connected to an alternating voltage phase line belonging to an alternating voltage network that is controlled.

18. The method according to claim 1, wherein it is a Voltage Source Converter configured to have a direct voltage across said two poles being 1 kV-1200 kV that is controlled.

19. A computer program embodied on a non-transitory computer readable medium and directly loadable into an internal memory of a digital computer and comprising software code portions for carrying out the method according to claim 1 when the program is run on a computer.

20. The computer program according to claim 19 provided at least partially through a network as the Internet.

21. A non-transitory computer readable medium having a program recorded thereon, in which the program is adapted to make a computer carry out the method according to claim 1.

22. An apparatus for converting alternating voltage into direct voltage and conversely, which comprises a Voltage Source Converter having at least one phase leg connecting to opposite poles of a direct voltage side of the converter and comprising a series connection of switching elements, each of said switching elements having at least two semiconductor devices of turn-off type, at least two free-wheeling diodes connected in parallel therewith and at least one energy storing capacitor, a mid point of said series connection forming a phase output being configured to be connected to an alternating voltage side of the converter and to divide the phase leg into an upper valve branch and a lower valve branch, said apparatus comprising a control arrangement configured to control said at least two semiconductor devices of each of said switching elements so as to obtain, for that switching element, one of a) a first switching state and b) a second switching state, in which for a) the first switching state, the voltage across said at least one energy storing capacitor or for b) the second switching state, a zero voltage, is applied across terminals of each of the switching elements, for obtaining a determined said alternating voltage on said phase output, wherein said control arrangement comprises:

a first device configured to deliver an individual saw tooth voltage for the control of each of said switching elements, the saw tooth voltages of the switching elements being identical but evenly distributed over the time with respect to each other with a phase shift of $2\pi/pN$ between adjacent saw tooth voltages, in which p is the pulse number defined as period of a reference alternating voltage/period of the saw tooth voltage and N is the number of switching elements in said phase leg;

a second device configured to deliver an individual said reference alternating voltage to each of said switching elements with the same frequency and phase as that of the other said switching elements; and a control device configured to control said switching elements according to a Pulse Width Modulation pattern so that each of said switching elements is switched to change said switching state from the first to the second and conversely each time the saw tooth voltage wave for the corresponding switching element crosses the reference alternating voltage belonging to the corresponding switching element, wherein said second device comprises a first member adapted to measure the voltage across said energy storing capacitor of each of said switching elements, a second member adapted to compare the direct voltage with a reference direct voltage, and a third member configured to calculate and set the amplitude of said individual reference alternating voltage for each of said switching elements on the basis of the result of said comparison.

23. The apparatus according to claim 22, further comprising a fourth member configured to measure the direct voltage across said poles of the direct voltage side of the converter and deliver the result of said measurement to said second member for said comparison.

24. The apparatus according to claim 22, wherein said control arrangement comprises a member configured to calculate an average of the voltages measured across said energy storing capacitors of the switching elements and deliver said average as said reference direct voltage.

25. The apparatus according to claim 22, further comprising a measuring device configured to measure the alternating voltage on said alternating voltage side of the converter during the control of the converter, and said second device is configured to use the amplitude of the alternating voltage when setting the amplitudes of said individual reference alternating voltages.

26. The apparatus according to claim 22, wherein said first device is adapted to deliver individual saw tooth voltages having a pulse number p being a non-integer.

27. The apparatus according to claim 26, wherein said first device is configured to deliver individual saw tooth voltages having a pulse number varying continuously or intermittently during said control.

28. The apparatus according to claim 22, wherein the number N of the switching elements of said phase leg is $\geq 8$.

29. The apparatus according to claim 28, wherein the number N of said switching elements of said phase leg is 16, and said first device is adapted to use a pulse number p of 3<p<4.

30. The apparatus according to claim 22, wherein said at least two semiconductor devices of the switching elements are IGBTs (Insulated Gate Bipolar Transistor) or GTOs (Gate Turn-Off thyristor).

31. The apparatus according to claim 22, wherein said Voltage Source Converter is configured to have said direct voltage side connected to a direct voltage network for transmitting High Voltage Direct Current (HVDC) and the alternating voltage side connected to an alternating voltage phase line belonging to an alternating voltage network.

32. The apparatus according to claim 22, wherein said Voltage Source Converter is configured to have a direct voltage across said two poles being 1 kV-1200 kV.

33. A plant for transmitting electric power comprising a direct voltage network and at least one alternating voltage network connected thereto through a station, said station being adapted to perform transmitting of electric power between the direct voltage network and the alternating voltage network and comprising at least one Voltage Source Converter adapted to convert direct voltage into alternating voltage and conversely, wherein said station of the plant comprises an apparatus according to claim 22.

* * * * *